(12) United States Patent
Hermez

(10) Patent No.: US 9,472,118 B2
(45) Date of Patent: Oct. 18, 2016

(54) DISC JOCKEY TABLE SIMULATION APPARATUS AND RELATED METHODS

(71) Applicant: Fady Hermez, El Cajon, CA (US)

(72) Inventor: Fady Hermez, El Cajon, CA (US)

( * ) Notice: Subject to any disclaimer, the term of this patent is extended or adjusted under 35 U.S.C. 154(b) by 0 days.

(21) Appl. No.: 14/946,160

(22) Filed: Nov. 19, 2015

(65) Prior Publication Data

US 2016/0140863 A1 May 19, 2016

Related U.S. Application Data

(60) Provisional application No. 62/082,072, filed on Nov. 19, 2014.

(51) Int. Cl.
*G09B 15/06* (2006.01)
*G11B 27/00* (2006.01)

(52) U.S. Cl.
CPC .............. *G09B 15/06* (2013.01); *G11B 27/00* (2013.01); *G10H 2210/241* (2013.01); *G10H 2250/035* (2013.01)

(58) Field of Classification Search
CPC ................................ G09B 15/06; G11B 27/00
See application file for complete search history.

(56) References Cited

U.S. PATENT DOCUMENTS

| | | | | |
|---|---|---|---|---|
| 3,244,423 A | * | 4/1966 | Freathy | G11B 3/08 369/257 |
| 3,260,528 A | * | 7/1966 | Hardy | G11B 25/04 369/75.11 |
| D417,450 S | * | 12/1999 | Kurachi | D14/168 |
| D454,552 S | * | 3/2002 | Nakane | D14/168 |
| 6,469,974 B1 | * | 10/2002 | Kaneko | G11B 3/60 369/127 |
| D491,915 S | * | 6/2004 | Warden | D14/203 |
| 7,257,072 B2 | * | 8/2007 | Kikuchi | G11B 15/54 369/4 |
| D615,555 S | * | 5/2010 | Ho | D14/203.1 |
| D615,595 S | * | 5/2010 | Williamson | D14/496 |
| D624,053 S | * | 9/2010 | Williamson | D14/203 |
| D628,981 S | * | 12/2010 | Mazur | D14/203 |
| D648,324 S | * | 11/2011 | Medas | D14/217 |
| 8,153,881 B2 | * | 4/2012 | Coppard | A63F 13/08 84/615 |
| 8,315,143 B2 | * | 11/2012 | Frederick | G11B 3/64 369/264 |
| 8,362,349 B2 | * | 1/2013 | Mazur | G10H 1/0091 84/464 A |
| D689,486 S | * | 9/2013 | O'Donnell | D14/217 |
| D721,675 S | * | 1/2015 | Hong | D14/217 |
| 2005/0052981 A1 | * | 3/2005 | Shim | G11B 19/00 369/59.26 |
| 2007/0050060 A1 | * | 3/2007 | Liu | G10H 1/0091 700/94 |
| 2007/0079315 A1 | * | 4/2007 | Mittersinker | G10H 1/0091 720/656 |
| 2007/0280489 A1 | * | 12/2007 | Roman | H04H 60/04 381/119 |
| 2008/0046098 A1 | * | 2/2008 | Corbin | G10H 1/0091 700/1 |
| 2016/0140863 A1 | * | 5/2016 | Hermez | G09B 15/06 84/465 |

* cited by examiner

*Primary Examiner* — Robert W Horn
(74) *Attorney, Agent, or Firm* — Buche & Associates, P.C.; John K. Buche; Bryce A. Johnson

(57) ABSTRACT

A DJ table simulation apparatus that allows a DJ to practice different turntablism and scratching techniques without the use of a full turntable, mixer, and DJ equipment set up. The DJ table simulation apparatus is a portable tool that provides a platform for DJs to build up muscle memory and perfect the manipulation of vinyl records and sliders back and forth without requiring the use of electric powered turntables and mixer. The DJ table simulation apparatus is comprised of a modified turntable platter, a modified vinyl record, crossfader channels, and volume channels.

1 Claim, 4 Drawing Sheets

DISC JOCKEY TABLE SIMULATION APPARATUS AND RELATED METHODS

CROSS-REFERENCE TO RELATED APPLICATIONS

This application claims the benefit and priority of U.S. Provisional Application No. 62/082,072 filed Nov. 19, 2014, entitled "Disc jockey table simulation apparatus and related methods."

STATEMENT REGARDING FEDERALLY SPONSORED RESEARCH OR DEVELOPMENT

Not applicable.

BACKGROUND OF INVENTION

1. Field of the Invention

The subject matter of this specification is in the field of disc jockey table simulation apparatuses and related methods.

2. Background of the Invention

The turntable, or variations of it, have been used to play music since the 1940's and with the rise of turntables came the term disc jockey (DJ), which refers to an individual who arranges and mixes musical records.

Today, DJs can be seen operating in a multitude of genres and implementing a variety of techniques. One of these areas is the art of turntablism, which emerged from the hip hop culture in the 1970's. At this time, artists began producing unique sounds and effects over recorded music by manipulating a record on a turntable. As the art progressed, DJs began developing several different techniques to manipulate a record, such as "scratching," "beat juggling," and "the break-beat." Generally, DJs have to practice these techniques in front of a basic DJ setup, which may consist of one or two turntables, slipmats, and a crossfader mixer.

One of the common turntablism techniques that produces a distinctive sound is "Scratching," which involves moving the record back and forth on the turntable. Another popular DJ technique, and a variation of "scratching," is the "crab scratch," which involves a specific manipulation of the cross fader with the DJs fingers. Mastering these techniques requires countless hours of practice in front of turntables to build up muscle memory and develop the ability to manipulate the record and crossfader with precision.

With the equipment in mind, DJs may have difficulty finding time to practice because DJ equipment can be expensive and burdensome to transport. Thus, a need exists for an affordable and portable DJ table simulation and training device that allows DJs to practice manipulating the record and the cross fader in just about any setting, from on a bus, to sitting on a couch.

Currently, there are apparatuses and designs that allow a DJ to practice, but they are not realistic DJ table simulation and training devices. One example is U.S. Pat. No. 8,153,881 by Coppard et al., which teaches a DJ video game controller that allows the user to press and manipulate buttons in response to instructive cues. However, this DJ video game controller does not allow for realistic practice because there is no record to manipulate.

Therefore, no apparatus exists that allows a DJ to practice manipulating a record and cross fader without being in front of a full turntable and mixer set. Thus, there remains a need for DJs to practice their scratching and DJ techniques in virtually any environment without requiring them to pack up their DJ equipment and bringing it with them wherever they want to practice.

SUMMARY OF THE INVENTION

In view of the foregoing, it is an object of the present invention to provide a DJ table simulation apparatus that allows a DJ to practice scratching and other DJ techniques without being in front of a full turntable and mixer set.

It is another object of the present invention to provide a DJ table simulation apparatus that allows a DJ to simulate being in front of a turntable and mixer set.

It is another object of the present invention to provide a DJ table simulation apparatus that is portable and operable in a variety of settings.

It is another object of the present invention to provide a DJ table simulation apparatus that allows a DJ to build up muscle memory for performing different scratching and DJ techniques.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed assemblies, and therefore, are not to be considered limiting in their scope, for the disclosed assemblies may admit to other equally effective embodiments that will be appreciated by those reasonably skilled in the relevant arts. Also, figures are not necessarily made to scale.

DETAILED DESCRIPTION OF THE INVENTION

Generally, disclosed is a DJ table simulation apparatus 1 that allows a DJ to practice scratching and other DJ techniques on a portable and condensed DJ turntable and mixer setup without requiring the use of an electrically powered turntable and mixer.

Figure 1:
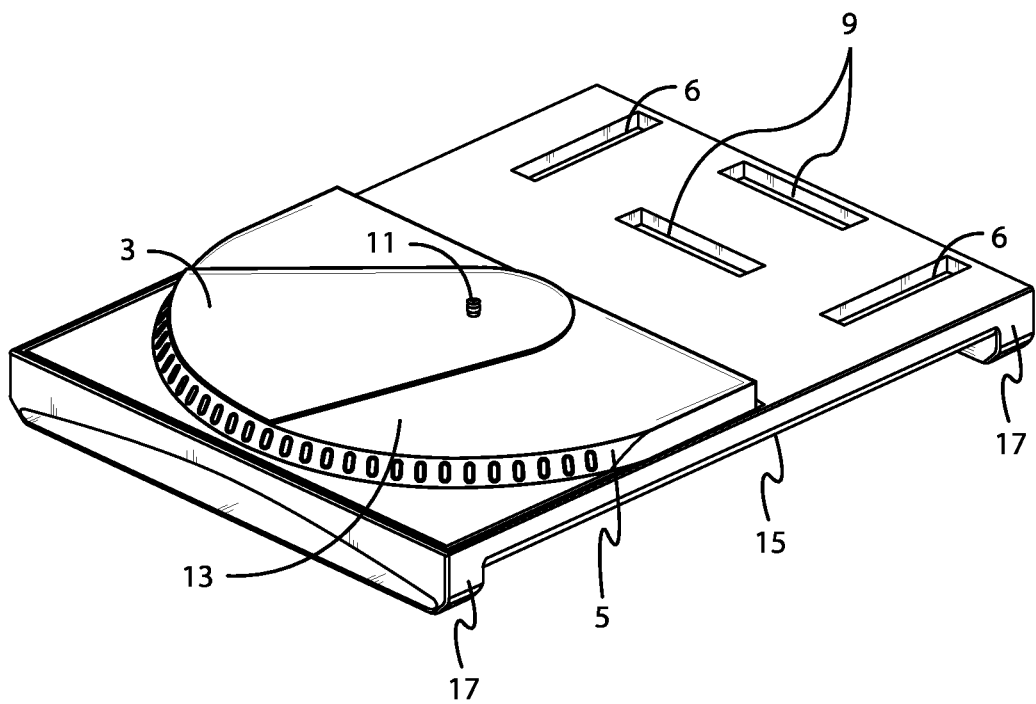
FIG. 1 is a perspective view of one embodiment of the DJ table simulation apparatus.

Referring to FIG. 1, in one embodiment, the DJ table simulation apparatus 1 consists of a platter 5 with a spindle 11 that resembles only a portion of a turntable. The platter 5 is approximately three quarters of the size of a full turntable and is equipped with a slipmat 13, which placed atop the platter's 5 deck. The DJ table simulation apparatus 1 also has a "V" cut vinyl record 3 that maintains the record's aperture, which receives the spindle 11. The spindle 11 may be composed of steel, plastic, or any other rigid material apparent to one of skill in the art. Additionally, adjacent to the platter 5 is a plurality of channels. The two crossfader channels 6 are located at the top and bottom of the DJ table simulation apparatus 1 and receive crossfader sliders. The two volume channels 9 receive volume sliders and are located within and perpendicular to the crossfader channels 6.

In use, a DJ may manipulate the vinyl record 3 back and forth anywhere on the platter 5. A DJ may also manipulate any of the crossfader sliders or volume sliders back and forth. A DJ may use either hand to manipulate the vinyl record 3 or the crossfader and volume sliders. Additionally, the vinyl record 3, and the crossfader and volume sliders may be manipulated simultaneously. Furthermore, the crossfader channels 6 and the volume channels 9 may be equipped with a tensile element that would provide tension and create resistance against the DJs manipulation of the crossfader or volume sliders back and forth. The tensile element may be composed of any element apparent to one of skill in the art.

Figure 2:
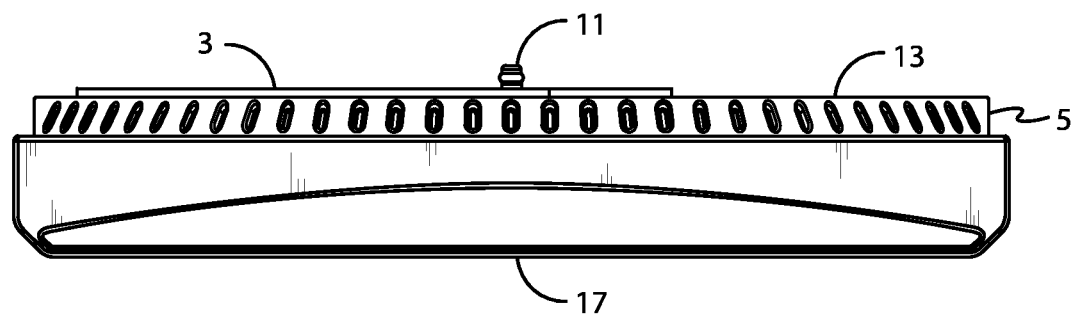
FIG. 2 is a side view of one embodiment of the DJ table simulation apparatus.

Referring to FIG. 2, the platter 5 may have a slipmat 13 placed on top of the platter's 5 deck. In one embodiment, the slipmat 13 may be adhered to the platter's 5 deck by any adhering material that is apparent to one of skill in the art. Additionally, the slipmat 13 may be composed of cloth or other synthetic materials apparent to one of skill in the art.

Figure 3:
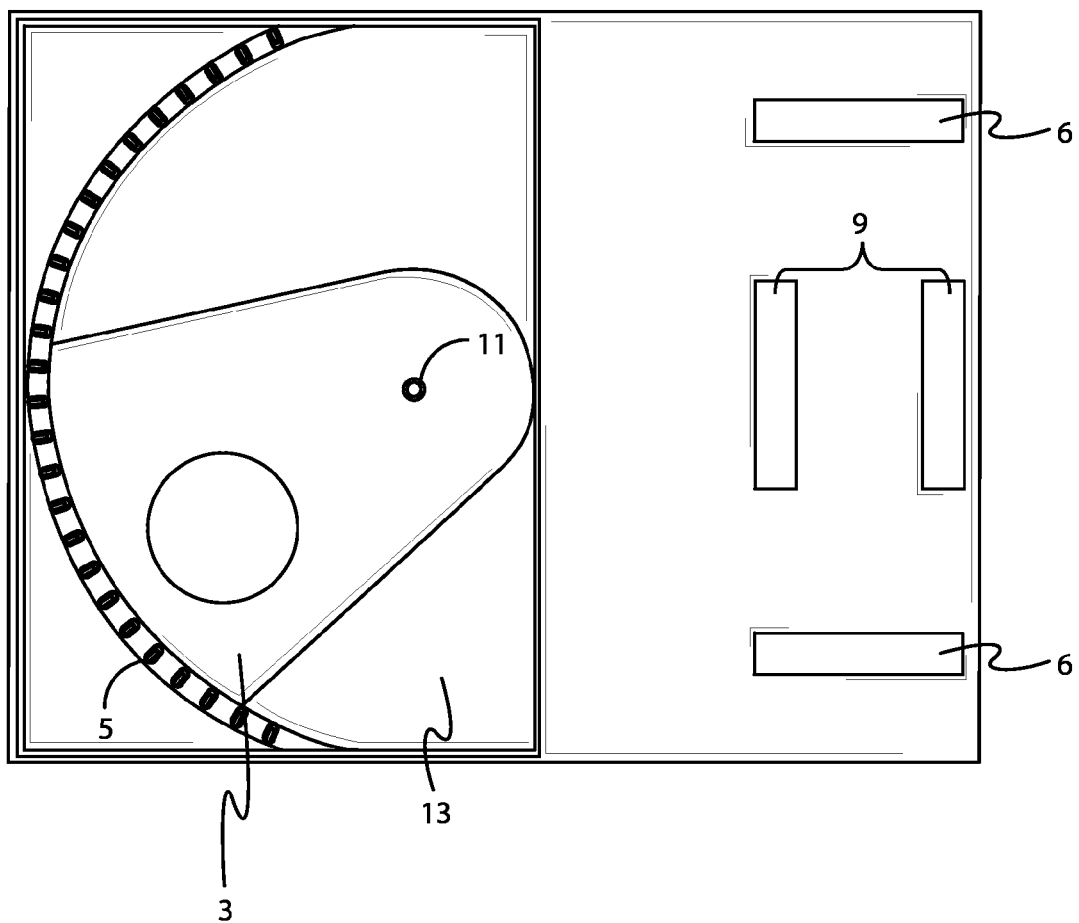
FIG. 3 is a top view of one embodiment of the DJ table simulation apparatus.

Referring to FIG. 3, the "V" cut vinyl record 3 may be manufactured from existing records so that the feel and consistency of the record is present. The "V" cut vinyl record 3 maintains the aperture so that it receives the spindle 11 and allows the vinyl record 3 to be manipulated back and forth around the spindle 11. The "V" cut vinyl record 3 may also be composed of plastic or any other materials apparent to one of skill in the art.

Figure 4:
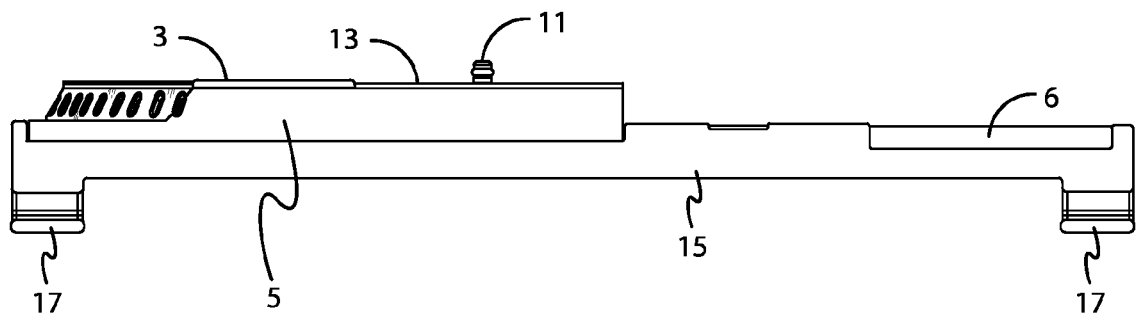
FIG. 4 is a cross-sectional front view of one embodiment of the DJ table simulation apparatus.

Referring to FIG. 4, the base 15 of the DJ table simulation apparatus 1 may have legs 17 on opposite sides to stabilize the DJ table simulation apparatus 1 if placed on a surface. The legs 17 may also facilitate a more stable base when placed on the DJ's lap by surrounding the DJ's legs.

Figure 5:
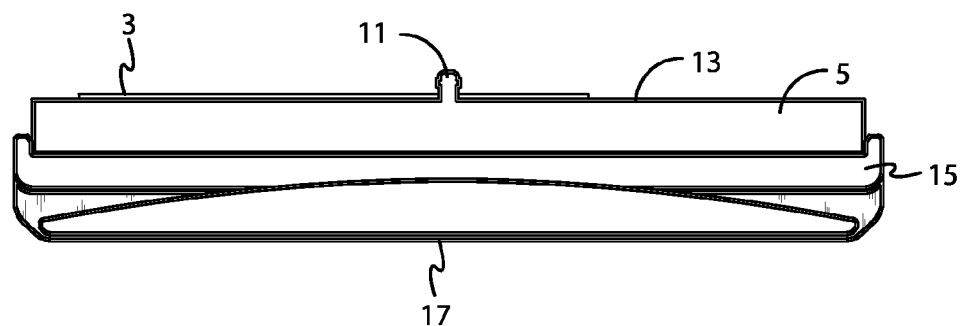
FIG. 5 is a cross-sectional side view of one embodiment of the DJ table simulation apparatus.

FIG. 5 shows a cross-sectional side view of one embodiment of the DJ table simulation apparatus 1 and includes the legs 17, base 15, platter 5, slipmat 13, vinyl record 3, and spindle 11.

Figure 6:
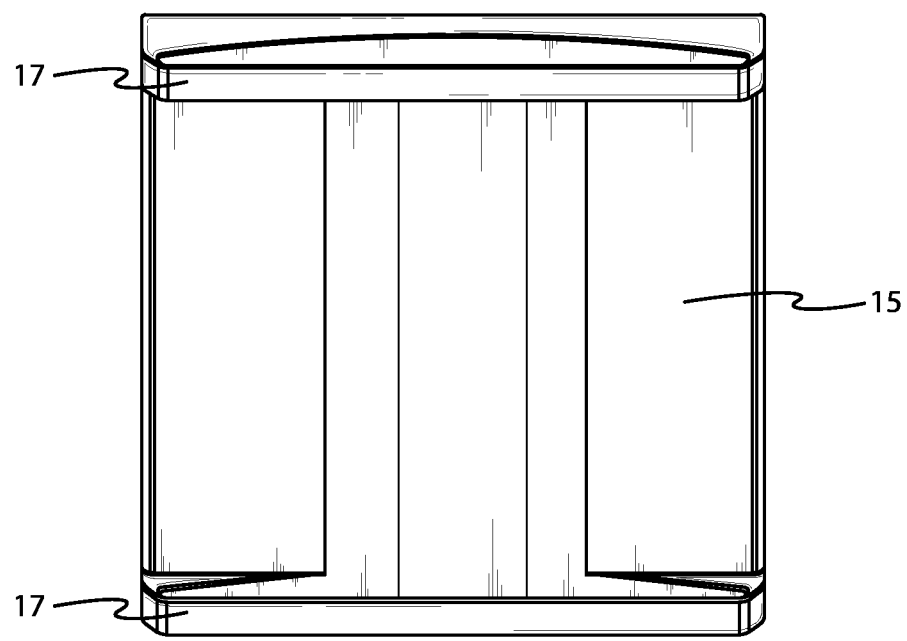
FIG. 6 is a bottom view of one embodiment of the DJ table simulation apparatus.

Referring to FIG. 6, the base 15 of the DJ table simulation apparatus 1 may be rectangular in shape and may be composed of a rigid material, such as plastic, wood, steel, or any other material apparent to one of skill in the art.

In another embodiment, the DJ table simulation apparatus 1 may be used with the platter 5 on the DJ's right hand side or rotated so that the platter 5 is on the DJ's left hand side. This allows a DJ to train both hands in manipulating the record 3 or the sliders.

In another embodiment, the platter 5 sits in a tray adjacent to the channels. The platter 5 may be removed from the tray and reoriented or rotated to mimic either the inner portion of a turntable or the outer portion of a turntable. Depending on which side the DJ would like the platter 5 and the mixer channels, the DJ can rotate the DJ table simulation apparatus 1 to simulate the aspect of a DJ turntable and mixer that he or she desires, that is, whether the DJ wants the mixer channels to be on the right hand side or the left hand side. This feature allows a DJ to realistically practice manipulating a record because a full sized turntable has the needle on the right hand side of the record, therefore, the DJ's right hand may be required manipulate the record on inner portion of a turntable when the platter 5 is on the DJ's right hand side and the left hand may be required to manipulate the outer portion of a turntable when the platter 5 is on the DJ's left hand side. Additionally, the bottom of the platter 5 may have an adhering material that allows the platter 5 to be secure in the tray, but still removable, such as Velcro, or any other material known to one of skill in the art.

In one embodiment, the platter's 5 round end may be facing outward toward the edge of the DJ table simulation apparatus 1. In another embodiment, the platter's 5 round end may be facing inward toward the center of the DJ table simulation apparatus 1.

In another embodiment, the DJ table simulation apparatus 1 may feature auxiliary audio inputs and a headphone jack, which allows a DJ to listen to an audio output. Additionally, LED lights may be added to the platter 5 to resemble a more realistic and interactive DJ table simulation apparatus 1. In another embodiment, the DJ table simulation apparatus 1 may be associated with software that can track the progress of the DJ's training based on the number of repetitions a vinyl record 3 or a slider is moved back and forth. The DJ table simulation apparatus 1 may be associated with software that can provide quantitative and qualitative feedback to the DJ. Additionally, the DJ table simulation apparatus 1 may also be associated with software that provides scratching and DJ technique instructions to the DJ in order to help the DJ improve.

Other features will be understood with reference to the drawings. While various embodiments of the method and apparatus have been described above, it should be understood that they have been presented by way of example only, and not of limitation. Likewise, the various diagrams might depict an example of an architectural or other configuration for the disclosed method and apparatus, which is done to aid in understanding the features and functionality that might be included in the method and apparatus. The disclosed method and apparatus is not restricted to the illustrated example architectures or configurations, but the desired features might be implemented using a variety of alternative architectures and configurations. Indeed, it will be apparent to one of skill in the art how alternative functional, logical or physical partitioning and configurations might be implemented to implement the desired features of the disclosed method and apparatus. Also, a multitude of different constituent module names other than those depicted herein might be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment, Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future, Likewise, where this document refers to technologies that would be apparent or known to one of ordinary skill in the art, such technologies encompass those apparent or known to the skilled artisan now or at any time in the future, The presence of broadening words and phrases such as "one or more," "at least," "but not limited to" or other like phrases in some instances shall not be read to mean that the narrower case is intended or required in instances where such broadening phrases might be absent. The use of the term "module" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

The claims filed herewith are incorporated by reference in their entirety into the specification as if fully set forth herein.

I claim:

1. A method of training a disc jockey in the scratch and crab scratch technique, using a DJ table simulator comprising a flat sided, laterally concatenated turntable platter secured in place on the table, the concatenated platter having a concatenated slip pad, a spindle, and a pie slice shape piece of a vinyl type record including the original aperture for placement on the spindle, and along the flat side of the platter toward the other side of the table comprising a channel with a slider therein, the method comprising:
   sliding the record slice radially and reciprocally on the slip pad with respect to the spindle with a first hand; and,
   placing the second hand adjacently to the first hand on the table and adjacently to the flat side of the platter on the slider and reciprocally sliding the slider, while sliding the record slice.

* * * * *